United States Patent
Hanby et al.

(10) Patent No.: US 9,553,440 B2
(45) Date of Patent: Jan. 24, 2017

(54) WIRE SEAL ASSEMBLY

(71) Applicant: WALBRO ENGINE MANAGEMENT, L.L.C., Tucson, AZ (US)

(72) Inventors: Jeffrey D. Hanby, Cass City, MI (US); Kevin L. Israelson, Cass City, MI (US); Douglas W. Salowitz, Jr., Palms, MI (US); Roger N. Smith, Lapeer, MI (US); David L. Speirs, Cass City, MI (US)

(73) Assignee: Walbro LLC, Tucson, AZ (US)

( * ) Notice: Subject to any disclaimer, the term of this patent is extended or adjusted under 35 U.S.C. 154(b) by 80 days.

(21) Appl. No.: 14/533,676

(22) Filed: Nov. 5, 2014

(65) Prior Publication Data

US 2015/0136472 A1    May 21, 2015

Related U.S. Application Data

(60) Provisional application No. 61/905,496, filed on Nov. 18, 2013.

(51) Int. Cl.
 *H01R 13/52* (2006.01)
 *H02G 15/013* (2006.01)

(52) U.S. Cl.
 CPC ............ *H02G 15/013* (2013.01); *H01R 13/52* (2013.01)

(58) Field of Classification Search
 CPC ....... H01R 13/52; H01R 39/08; H01R 35/025; H02G 15/013
 USPC .................. 439/271–278, 352–358
 See application file for complete search history.

(56) References Cited

U.S. PATENT DOCUMENTS

| | | | |
|---|---|---|---|
| 2,152,504 A | 3/1939 | Scott et al. | |
| 2,552,414 A | 5/1951 | Eriksen et al. | |
| 3,398,391 A | 8/1968 | Brishka | |
| 3,533,051 A | 10/1970 | Ziegler, Jr. | |
| 3,687,447 A | 8/1972 | Mundus | |
| 4,373,112 A | 2/1983 | Mizuno | |
| 6,083,040 A | 7/2000 | Mosquera | |
| 6,508,666 B1 | 1/2003 | Francis | |
| 6,581,579 B1 | 6/2003 | Knight et al. | |
| 6,666,732 B1 | 12/2003 | Endacott | |
| 6,679,726 B1 | 1/2004 | Tunn et al. | |
| 7,175,481 B1 | 2/2007 | Cotton et al. | |
| 8,662,910 B2 * | 3/2014 | Ichio ................ | H01R 13/5208 439/206 |
| 8,747,154 B2 * | 6/2014 | Uchiyama .......... | H01R 13/5208 439/587 |
| 2001/0016457 A1 * | 8/2001 | Taguchi ............. | H01R 13/4361 439/752 |

* cited by examiner

*Primary Examiner* — Khiem Nguyen
(74) *Attorney, Agent, or Firm* — Reising Ethington P.C.

(57) ABSTRACT

In at least some implementations, a seal for a wire includes a body having at least one opening adapted to receive at least one wire therethrough, and an axially extending engagement surface disposed around at least a portion of each of said at least one openings. The engagement surface has at least a portion that is not parallel to an axis of the opening and is disposed at an acute included angle relative to the axis so that, when the engagement surface is contacted by another component, the size of the adjacent opening tends to be reduced.

15 Claims, 3 Drawing Sheets

WIRE SEAL ASSEMBLY

REFERENCE TO CO-PENDING APPLICATION

This application claims the benefit of U.S. Provisional Application No. 61/905,496 filed Nov. 18, 2013, which is incorporated herein by reference in its entirety.

TECHNICAL FIELD

The present disclosure relates generally to a wire seal assembly, such as may be used to provide a seal for, by way of an example without limitation, electrical wires that pass through a wall from outside of a fuel tank to the fuel tank interior.

BACKGROUND

Some fuel tanks include electrical components in an interior of the fuel tank. To power the components and/or provide electrical signals into or out of the fuel tank, wires are passed through a wall of the tank. The openings through which the wires pass need to be sealed against fluid leakage, and may also be subject to requirements regarding fuel vapor permeation. Seal assemblies for such wires are often complex and costly to implement. For example, some assemblies include metal pins that require soldering, crimping or other operations to be performed on them.

SUMMARY

In at least some implementations, a seal for a wire includes a body having at least one opening adapted to receive at least one wire therethrough, and an axially extending engagement surface disposed around at least a portion of each of said at least one openings. The engagement surface has at least a portion that is not parallel to an axis of the opening and is disposed at an acute included angle relative to the axis so that, when the engagement surface is contacted by another component, the size of the adjacent opening tends to be reduced.

In at least some implementations, a component having a wire pass through and a seal for the wire includes a wall, a compression surface and a seal. The wall of the component may include at least one opening extending through the wall to receive at least one wire that passes through the wall. The compression surface is carried by the wall adjacent to each of said at least one openings. And the seal is disposed adjacent to the compression surface and has an opening aligned with each of said at least one openings in the wall so that one or more wires pass through the seal and the openings of the wall. The seal includes an axially extending engagement surface disposed around at least a portion of each opening in the seal. The engagement surface has at least a portion that is not parallel to an axis of the opening and is disposed at an acute included angle relative to the axis so that when the engagement surface is in contact with a corresponding compression surface the size of the corresponding opening in the seal is reduced to provide a more fluid-tight seal between the seal and said at least one wire.

A seal assembly may include a seal having at least one opening adapted to receive at least one wire therethrough, and an axially extending engagement surface disposed around at least a portion of each of opening. The engagement surface has at least a portion that is not parallel to an axis of the opening and is disposed at an acute included angle relative to the axis so that when the engagement surface is contacted by another component the size of the adjacent opening tends to be reduced. The assembly may further include a seal clamp engaged with the seal and including an opening aligned with each opening in the seal so one or more wires pass through the seal clamp.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
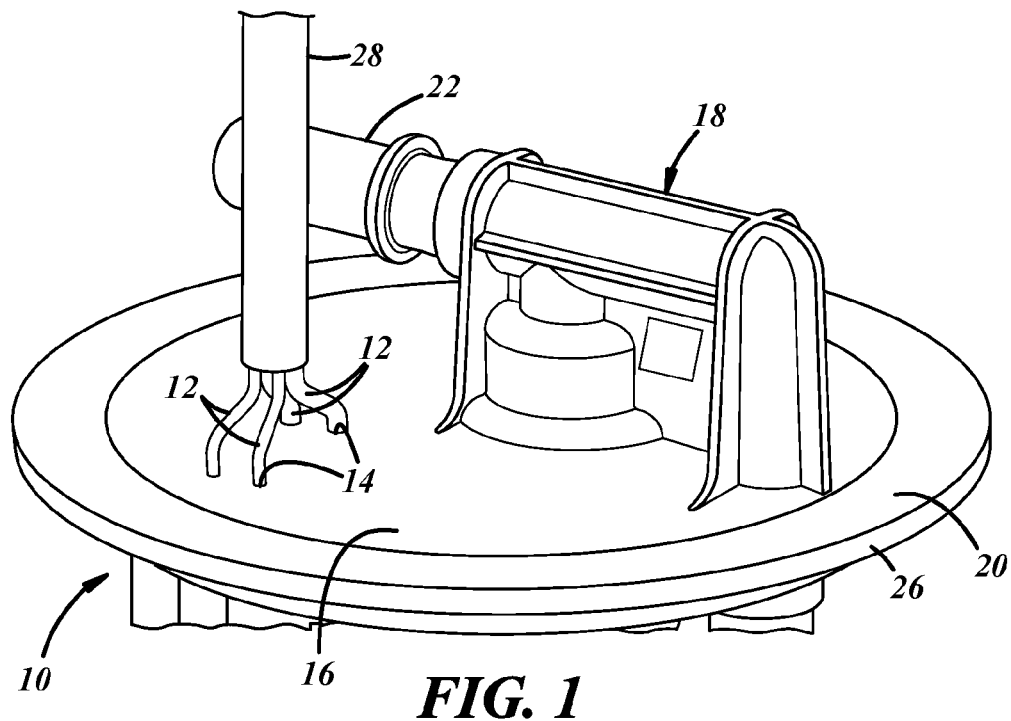
FIG. 1 is a fragmentary perspective top view of a fuel tank module showing a mounting flange for the module with electrical wires passing through the mounting flange.
Figure 2:
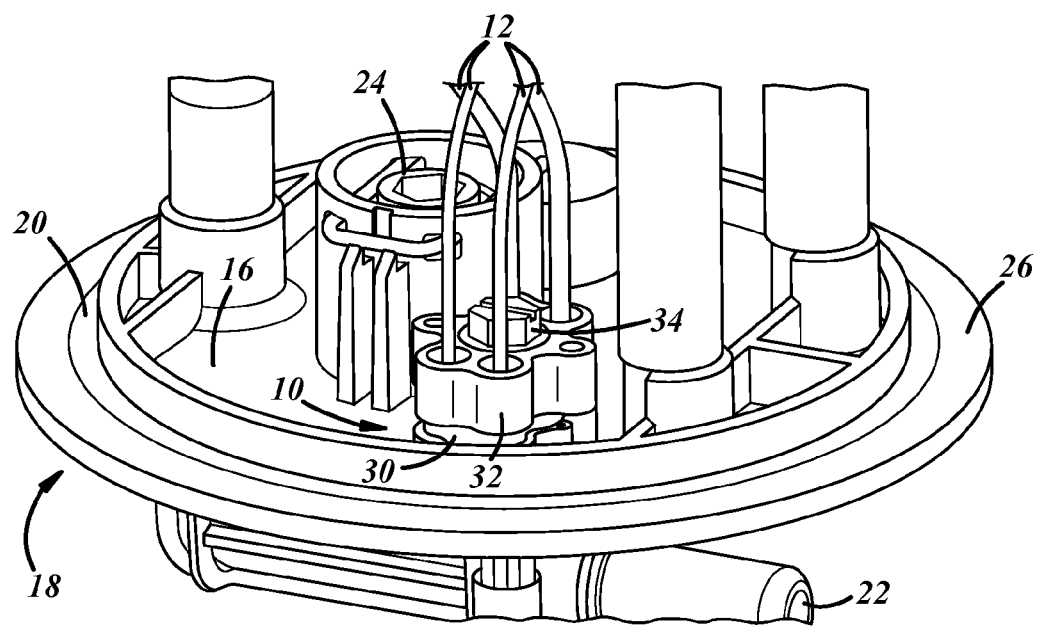
FIG. 2 is a fragmentary perspective bottom view of the mounting flange.

Referring in more detail to the drawings, FIGS. 1 and 2 illustrate a fuel system component with a wire seal assembly 10. In at least some implementations, the assembly 10 may be used to permit, for example, electrical wires 12 to pass through openings 14 in a wall 16 of a fuel system component 18 while preventing fuel from leaking through the openings 14 and inhibiting or preventing hydrocarbon vapors from passing through the openings. In the illustrated example, the fuel system component 18 is a fuel pump module that includes a fuel pump located within a fuel tank when a mounting flange 20 is connected to the fuel tank. The electrical wires 12 may be used to provide power from outside of the fuel tank to the fuel pump, or for various sensors (e.g. fuel pressure or fuel level sensors), controllers or the like that are located within the fuel tank. Of course, the wire seal assembly 10 may be used with other components (e.g. wires passing directly through a wall of the fuel tank, a vent valve, liquid/vapor separator, vapor handling canister, etc) and for other purposes.

As shown in FIGS. 1 and 2, the module flange 20 may include a fuel outlet passage 22 that extends through and may be formed integrally in the flange. Fuel discharged from the fuel pump is routed through the outlet passage 22 for delivery to downstream components, and ultimately an engine to support engine operation. A fuel pressure regulator 24 (FIG. 2) may be mounted to or otherwise carried by the flange 20 and be in communication with the outlet passage 22 to regulate the pressure of fuel discharged from the outlet passage. When the pressure in the outlet passage 22 is above a threshold pressure, the regulator 24 may route some fuel back into the fuel tank through a bypass outlet, as is known in the art. The mounting flange 20 has a wall 16 adapted to overlie and close an opening in the fuel tank, and the wall 16 may include a peripheral, circumferentially continuous rim 26 adapted to overlie and be sealed to the fuel tank. The flange 20 includes at least one opening 14 through which an electrical wire 12 passes through the wall 16.

In the illustrated embodiment, the mounting flange 20 has one opening 14 or passage through its wall 16 for each wire 12 that passes through the wall, and four wires are used. Two wires 12 provide power to the fuel pump and two wires are coupled to a fuel level sensor which provides a signal indicative of the amount of fuel in the fuel tank. Outside of the tank, if desired and as shown, the wires 12 may be received in a conduit 28 to facilitate routing and handling of the wires and/or to protect the wires.

Referring now to FIGS. 2-5, the wire seal assembly 10 includes a seal 30, a seal clamp 32 and a retainer 34. The seal 30 may be anything adapted to provide the desired barrier to fluid or vapor leakage through the flange openings 14. While usually described herein as a singular item, the seal 30 may comprise more than one component which may be separately assembled relative to one or more wires 12, or integrated into a single, unitary component. The seal clamp 32 may be any structure suitable to retain the position of the seal 30 and/or provide a force on the seal (e.g. compression) to improve its sealing performance. Finally, the retainer 34 may be any component adapted to maintain the in use/assembled position of one or both of the seal clamp 32 and the seal 30.

Figure 3:
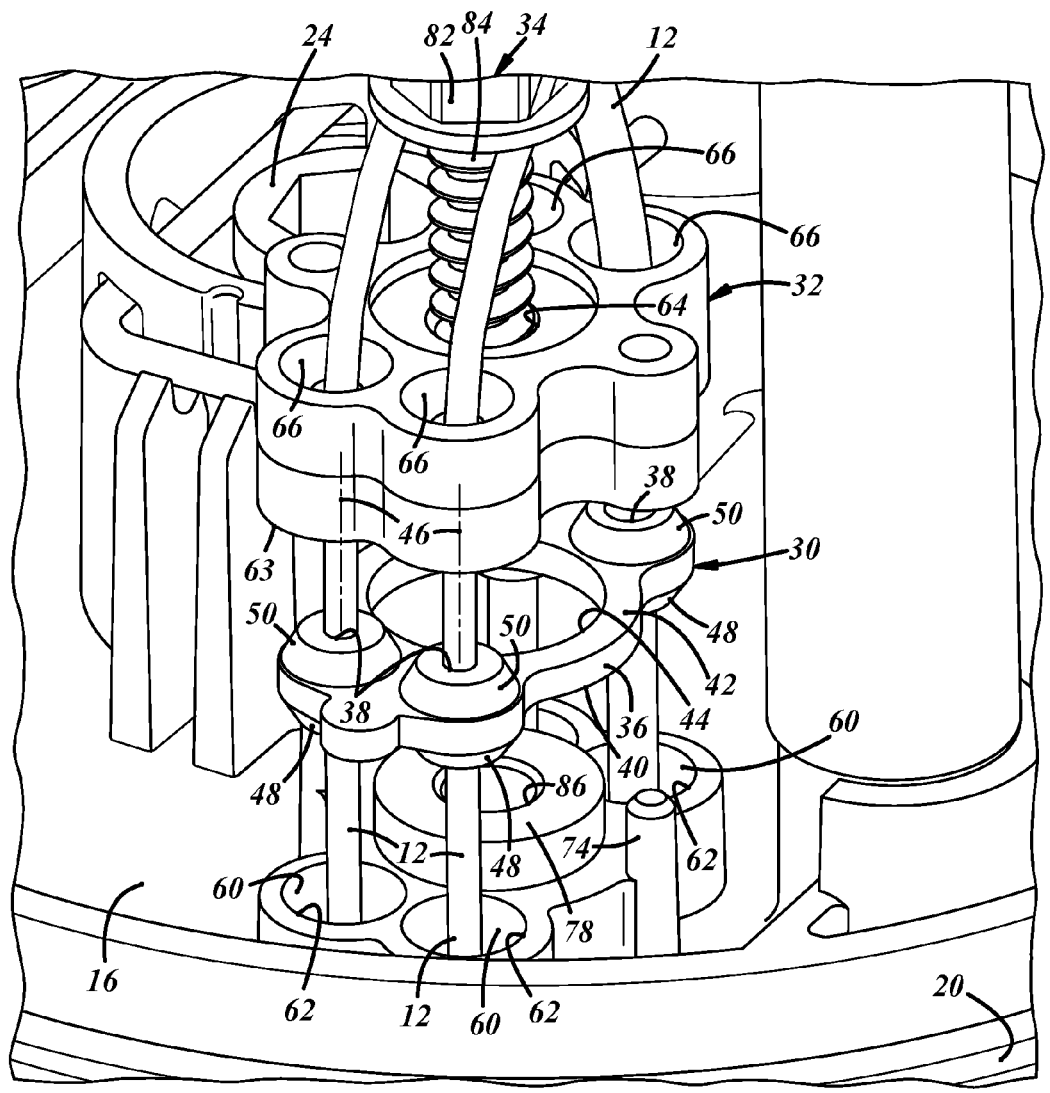
FIG. 3 is a fragmentary perspective bottom view of the mounting flange showing a wire seal assembly disassembled.
Figure 4:
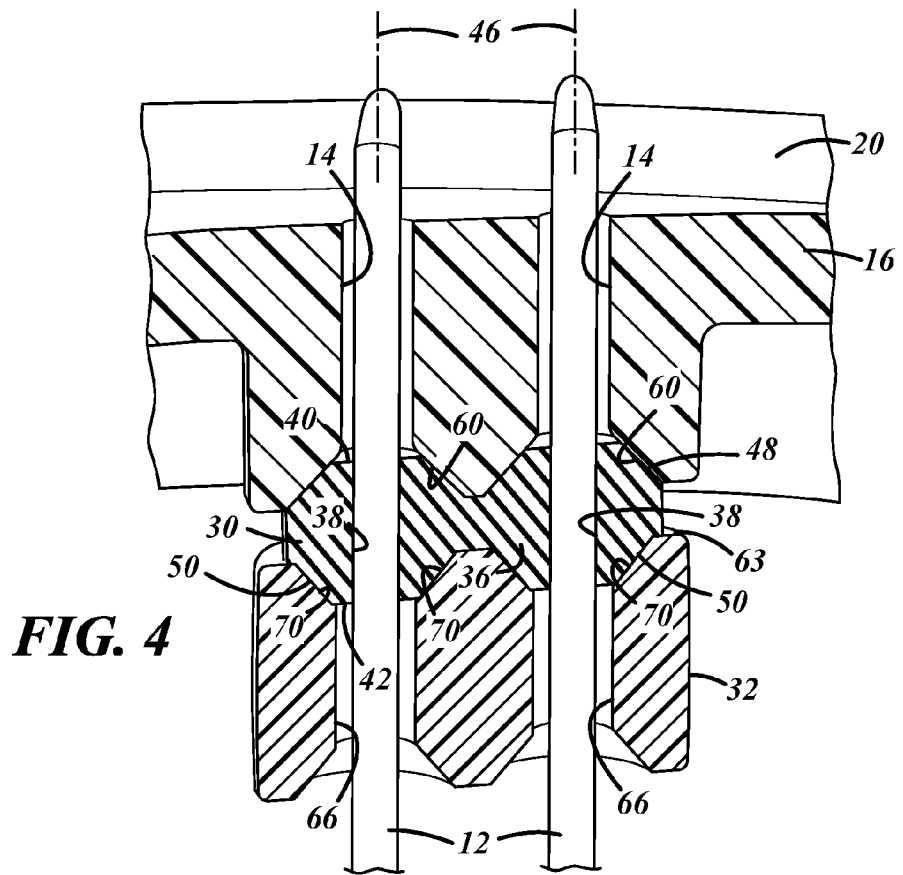
FIG. 4 is a fragmentary cross-sectional view of the mounting flange showing the wire seal assembly.
Figure 5:
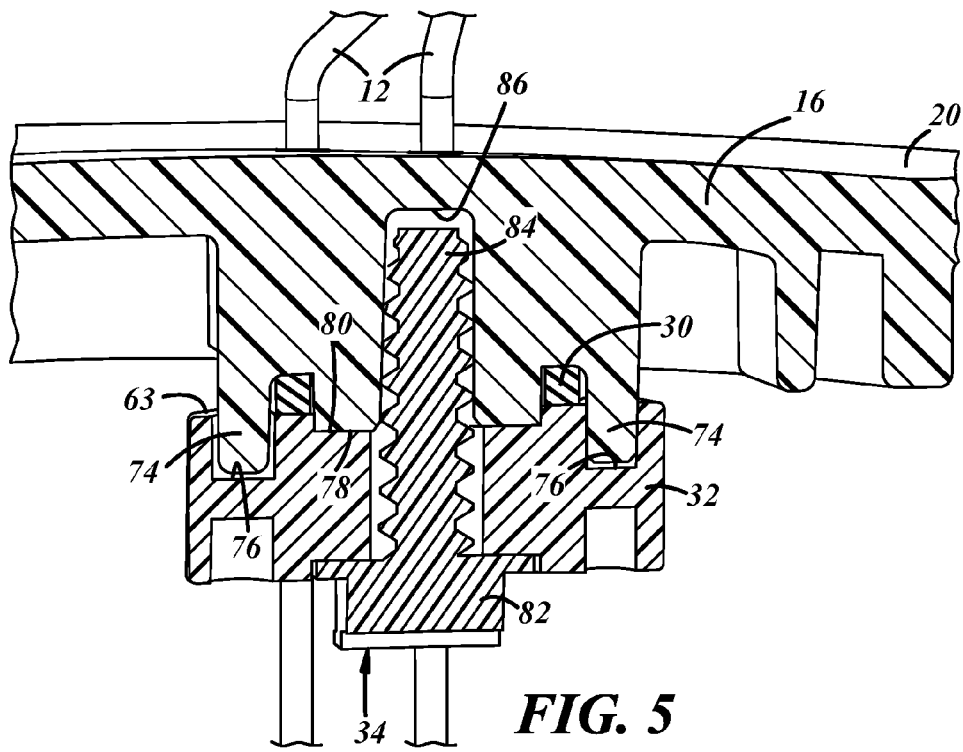
FIG. 5 is another fragmentary cross-sectional view of the mounting flange showing the wire seal assembly.

As shown in FIGS. 3-5, in at least some implementations, the seal 30 may comprise a main body 36 and at least one opening 38 through the main body with each opening adapted to receive at least one wire 12 therethrough. In at least some implementations, one seal opening 38 may be provided for each wire 12 with which the seal 30 is associated. The seal 30 may be formed of a flexible or compressible and resilient material, such as certain plastic, composite, and elastomeric materials that are suitable for use in the intended environment. In the example of a fuel system component, the seal 30 may be formed from a material suitable for immersion to contact with the fuel, such as fluorocarbon, nitrile rubber, or fluorosilicone, and may have a Shore A hardness of 40 to 95. In the example shown, the main body 36 is defined by a single piece of molded material having opposed sides with a first side 40 adapted to engage the mounting flange 20 and a second side 42 adapted to engage the seal clamp 32. A central opening 44 may be provided so that the retainer 34 may be secured to the mounting flange 20, as will be discussed later.

The main body 36 as shown has four separate openings 38 therethrough that each define a passage through which one wire 12 extends. Of course, the openings 38 need not be completely separate and more than one wire 12 may be received in one opening, if desired. Each opening 38 may have an axis 46, and the axes of all openings may be parallel (at least when the seal 30 is in its natural, uncompressed and unflexed state), if desired.

Outboard of each opening 38, one or more engagement surfaces 48, 50 may be provided that, when engaged with another surface, tend to compress at least some seal material inwardly toward the axis 46. The engagement surfaces 48, 50 may extend axially and each engagement surface may surround at least a portion of a corresponding seal opening 38. Each engagement surface 48, 50 may also have at least a portion that is not parallel to the axis 46 of the opening 38 and is disposed at an acute included angle relative to the axis so that when the engagement surface is contacted by another component the size of the adjacent opening 38 tends to be reduced. Where the openings 38 are sufficiently spaced apart, each engagement surface 48, 50 may be independent of and separate from the other engagement surfaces. Of course, other arrangements may be utilized.

In the implementation shown, two engagement surfaces 48, 50 are provided adjacent to each opening 38 with a first engagement surface 48 adjacent to the first side 40 of the seal 30 and a second engagement surface 50 adjacent to the second side 42 of the seal 30 and which may have at least a portion axially spaced from at least a portion of the first engagement surface 48. As shown, the second engagement surfaces 50 are completely separate from the first engagement surfaces 48, although other arrangements may be utilized. Each first engagement surface 48 may include a radially outwardly tapered, axially extending and circumferentially continuous surface such that the engagement surface 48 becomes wider as it extends axially away from the first side 40. Each second engagement surface 50 may be likewise shaped so that it also becomes wider as it extends away from the second side 42. With the first and second sides 40, 42 of the seal 30 being generally opposed, the first and second engagement surfaces 48, 50 may be mirror images of each other. Each engagement surface 48, 50 may be spaced and independent from the other engagement surfaces, or they may be at least partially connected, if desired. The engagement surfaces 48, 50 in this form may be convex, frustoconical, pyramid shaped or the like. Of course, other shapes are possible and the tapering need not be constant or uniform along the axial or circumferential extents of the engagement surfaces 48, 50.

The first engagement surfaces 48 are located to be received adjacent to and engaged by compression features or surfaces 60 which may be carried by (which includes being formed directly in) the mounting flange 20 or a component coupled to the mounting flange 20. The compression surfaces 60 may be spaced and independent from each other and each compression surface 60 may be generally concave and adapted to compress at least part of the seal material in the area of the associated engagement surface 48, 50 inwardly toward the axis 46 of its opening 38 and toward a wire 12 received within that opening. This may improve the sealed engagement between the wire 12 and seal 30 within and about the seal opening 38. This also provides a seal between the main body 36 and the flange 20 to at least greatly inhibit fluid flow or permeation between them. In the implementation shown, the compression surfaces 60 are defined in recesses 62 formed in the flange 20. The recesses 62 are generally complementarily shaped to the engagement surfaces 48 and may be smaller in size (e.g. diameter) and formed of a harder material to provide a desired inward compression of the seal 30 about the wires 12. Of course, the compression surfaces 60 need not be tapered or arranged at the same angle as the engagement surfaces 48, or have the same axial dimension. And the compressions surfaces 60 need not be circumferentially continuous or regularly/uniformly shaped—they may have any suitable shape to enable a desired seal about the wires 12.

The seal clamp 32 may be arranged with a first side 63 positioned to engage the second side 42 of the seal 30 and to trap the seal between the seal clamp 32 and mounting flange 20. The seal clamp 32 may be formed of a material that is harder than the seal 30 and may be a plastic or metal material. The seal clamp 32 may have a central passage 64 aligned with the central opening 44 in the seal 30 and a wire passage 66 axially aligned with each seal opening 38 to receive the wires 12 through the seal clamp 32, as shown in FIGS. 2-4. At the side 63 adjacent to the seal 30 and around each wire passage 66, the seal clamp 32 may include a compression surface 70 adapted to contact or otherwise act on the second engagement surfaces 50 of the seal 30. The seal clamp compression surfaces 70 may be similar in shape, construction and arrangement as the compression surfaces 62 of the mounting flange 20 and so they need not be discussed further herein. In assembly, the seal clamp compression surfaces 70 may be mirror images of the mounting flange compression surfaces 62, as best shown in FIG. 4. Engagement of the seal clamp compression surfaces 70 with the second engagement surfaces 50 provides additional seal compression against the wires 12 to improve the seal-to-wire sealing and also provides an additional seal at the seal 30 and seal clamp 32 interface. Especially at the seal and wire interface, the improved sealing may further inhibit fluid leakage or permeation through the flange openings 14.

To ensure proper location and orientation of the seal clamp 32 relative to the mounting flange 20, these components may include mating alignment features. In the implementation shown, the flange 20 includes one or more posts 74 (FIGS. 3 and 5) and the seal clamp 32 includes a like number of complementarily shaped recesses 76 each adapted to receive a post 74. To further accurately position the seal clamp 32 relative to the mounting flange 20, the seal clamp and flange may include stop surfaces 78, 80 that are engaged with each other in assembly. In the implementation shown, the flange 20 includes a cylindrical boss 78 and the seal clamp 32 includes a complementarily shaped recess 80, although other shapes, including a simple flat surface, may be used. Stop surfaces could instead or also be defined by the posts 74 and a surface in the recesses 76, if desired. The posts 74 and recesses may also hold the seal clamp against rotation or twisting, such as may occur when a threaded retainer 34 is secured to the flange 20.

In addition to ensuring proper alignment/orientation of the seal clamp 32 relative to the flange 20, the stop surfaces 78 (FIGS. 3 and 5), 80 (FIG. 5) may limit the amount of compression of the seal 30. Too much compression may unduly deform the seal 30 and compromise the sealing engagement of the wires 12. Likewise, not enough compression may compromise the integrity of the seal between the seal 30 and the flange 20, as well as between the seal 30 and wires 12. Therefore, ensuring contact of the stop surfaces 78, 80 permits a generally uniform compression of the seal 30 from part-to-part in a production run. In at least some implementations, the alignment feature(s) 76, compression surfaces 70, and stop surfaces 80 of the seal clamp 32 may all be formed in a single piece of material, that is, they may simply be different features of one integral and continuous body rather than separate features on more than one body.

As best shown in FIG. 5, the retainer 34 may overlie a portion of the seal clamp 32 and hold the seal clamp against the seal 30 and flange 20, preferably with the stop surfaces 78, 80 of the seal clamp 32 and flange 20 engaged. In the implementation shown, the retainer 34 includes a fastener, such as a screw, with a head 82 that overlies the seal clamp 32 and a shank 84 that extends through the central passage 64 in the seal clamp 32, central opening 44 in the seal 30 and into a blind bore 86 in the flange 20. The shank 84 may be threaded, and the bore 86 may likewise be threaded or the shank may be self-tapping as it is advanced into the bore, especially where the flange 20 is formed from plastic. Of course, the retainer 34 could be any suitable feature or object to retain the seal clamp 32 relative to the flange 20, such as, but not limited to, a clip, band, tether, detent, snap-fit, friction fit, glue, weld, and/or heat stake.

In at least some implementations, the wire seal assembly 10 disclosed herein does not require any metal pins for the wires 12 that are soldered, crimped or press-fit. Nor are o-rings or potting material required and the amount of seal material may be minimized to reduce cost. Further, fluid-tight sealing of multiple wires 12 may be achieved with very few parts and without intricate features or components, and by a very simple assembly process. In the illustrated embodiment, the wires 12 are simply passed through the flange openings 14, seal openings 38 and wire passages 66 in the seal clamp 32. Then, the retainer 34 is used/installed to hold the seal clamp 32 in place. The wires 12 themselves may have plastic or other insulating or seal promoting sheathing, and may be coated or impregnated with a material to improve the fluid-tight seal. One representative coating is sold under the tradename "Enviroseal" by Magna-tech Manufacturing.

Thus, in at least some implementations, the flexible seal 30 may be compressed into and directly engage the wire (which may include a sheath surrounding the electrical wiring) to provide an inexpensive wire pass-through assembly that may be fluid-tight and comprised of relatively few components. This assembly also permits the wire to pass directly through the wall, without requiring a first electrical connector having a housing that is coupled to one side of the flange and a mating second electrical connector coupled to an opposite side of the flange, with different wire sections connected to each of the connectors and electrically connected with each other via the electrical connectors. This requires two separate housings, two separate wire lengths and metal pins in each housing connected to a respective wire length, and also a multitude of seals between the wires/pins, their respective housings and between the individual electrical connectors and the wall to which they are coupled.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A wire pass-through seal assembly, comprising:
    a seal of a compressible material having at least one opening with an interior surface adapted to receive and circumferentially continuously engage an exterior surface of at least one wire passing therethrough, and a generally axially and circumferentially extending engagement surface disposed around at least a portion of each of said at least one openings, the engagement surface having at least a circumferentially continuous portion that is not parallel to an axis of the opening and is disposed at an acute included angle relative to the axis of the opening so that when the engagement surface is engaged by a complementary compression surface of another component at least a portion of the seal is compressed by relative displacement of the another component generally axially toward the seal to force the interior surface of the at least one opening into firm circumferentially continuous engagement with the exterior surface of the at least one wire to provide a more fluid tight seal between the seal and the at least one wire; and
    a seal clamp engaged with and compressing at least a portion of the seal and including an opening aligned with each of said at least one openings in the seal so that said at least one wire passes through the seal clamp.

2. The assembly of claim 1 which also includes a retainer having a portion that overlies and engages the seal clamp to retain the position of the seal clamp relative to the seal.

3. The assembly of claim 2 wherein the seal and seal clamp have aligned openings through which a portion of the retainer extends.

4. The assembly of claim 1 wherein the seal clamp includes a compression surface adjacent to each opening in the seal clamp and engaged with a corresponding engagement surface of the seal to compress the seal against the wires that pass through the seal.

5. The assembly of claim 4 wherein each compression surface is complementarily shaped to the corresponding engagement surface that the compression surface contacts.

6. The assembly of claim 1 wherein the seal clamp includes a stop surface adapted to engage a component to which the seal clamp is coupled to limit the compression of the seal between the seal clamp and said component.

7. A seal for a wire, comprising:
a body of a compressible material having:
at least one opening with a circumferentially interior surface adapted to receive an exterior surface of at least one wire passing therethrough, and
a generally axially and circumferentially extending engagement surface disposed around at least a portion of each of said at least one openings, the engagement surface having at least a portion that is not parallel to an axis of the opening and is disposed at an acute included angle relative to the axis so that when the engagement surface is engaged by a complimentary compression surface of another component, at least a portion of the body is compressed so that the interior surface of the at least one opening is forced into firm sealing engagement with an exterior surface of the at least one wire.

8. The seal of claim 7 wherein the body includes at least two openings with each opening adapted to receive at least one wire.

9. The seal of claim 7 wherein the engagement surface is circumferentially continuous and surrounds at least a portion of the axial extent of the opening.

10. The seal of claim 9 wherein the engagement surface is tapered so that it is wider at one axial end than its other axial end.

11. The seal of claim 8 wherein each opening in the body is separate from the other openings in the body and each engagement surface is separate from the other engagement surfaces.

12. The seal of claim 7 wherein said at least one opening defines a passage in which at least one wire is received and two engagement surfaces are provided for each opening, with at least a portion of a first engagement surface axially spaced from at least a portion of a second engagement surface.

13. The seal of claim 12 wherein the body includes two opposed surfaces and the first engagement surface is adjacent to one of the opposed surfaces and the second engagement surface is adjacent to the other of the opposed surfaces.

14. The seal of claim 12 wherein the first and second engagement surfaces are mirror images of each other.

15. The assembly of claim 1 wherein the engagement surface is substantially frustoconical.

* * * * *